United States Patent
Gillis et al.

(10) Patent No.: US 6,286,035 B1
(45) Date of Patent: Sep. 4, 2001

(54) VALIDATING AND PARSING ENGINE FOR SYSTEM CONFIGURATION AND SUPPORT COMMAND MESSAGES

(75) Inventors: Philip William Gillis; Danilo Giulianelli, both of Whippany, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/240,826

(22) Filed: Feb. 1, 1999

(51) Int. Cl.[7] ............................... G06F 9/46; G06F 15/16
(52) U.S. Cl. ........................... 709/206; 709/303; 717/5; 717/7
(58) Field of Search .................... 709/206, 303; 717/5, 7

(56) References Cited

U.S. PATENT DOCUMENTS

| | | | |
|---|---|---|---|
| 5,655,081 | * 8/1997 | Bonnell et al. | 709/202 |
| 5,734,903 | * 3/1998 | Saulpaugh et al. | 709/303 |
| 5,799,151 | * 8/1998 | Hoffer | 709/204 |
| 6,038,590 | * 3/2000 | Gish | 709/203 |
| 6,078,733 | * 6/2000 | Osborne | 709/250 |

* cited by examiner

Primary Examiner—Krisna Lim
(74) Attorney, Agent, or Firm—Cohen, Pontani, Lieberman & Pavane (57) ABSTRACT

Methods for parsing and validating a command message produced by a network element in a network utilizes table-drive approach. The messages are parsed by a parsing engine in object code stored at the network element and which operatively breaks down each of the messages into its constituent parameters. As each parameter is parsed, it is compared to a set of allowed values in object code stored in tables at the network element. Each validated parameter is entered into a data structure so that a valid message is populated. The methods allow for quick parsing and validation of existing messages and simple updating of the tables to allow for validation of new messages.

12 Claims, 5 Drawing Sheets

VALIDATING AND PARSING ENGINE FOR SYSTEM CONFIGURATION AND SUPPORT COMMAND MESSAGES

BACKGROUND OF THE INVENTION

1. Field of the Invention

This invention relates generally to methods for configuring, supporting and controlling network elements. More particularly, the invention is directed to methods for parsing and validating command and configuration messages that control network elements.

2. Description of the Prior Art

In real-time, embedded software applications such as telephony and data access products, system software must respond to command requests or messages from a number of different external interfaces. These commands are typically used for provisioning and system configuration, fault management, security management, performance management and other system functionality. Both the set of messages and their parameters can vary with either the system software implementation, or the version of the software that is being used, or both. One well known language or set of instructions which has been developed and used in the past to manage network elements is the Transaction Language 1 ("TL1"), which is currently the dominant management protocol for controlling telecommunications networks in North America. Typically, a TL1 engine starts a data receiving, session, sometimes referred to as a Craftperson session, using a Craft Interface Terminal ("CIT"). The CIT is essentially a "dumb" terminal which passes a TL1 ASCII string that is a single, or set of, TL1 command(s) to external interfaces at the network elements. When the network or external element sends a response back through the command router, the TL1 engine will format the output message according to TL1 syntax and send the formatted string to the CIT terminal which initiated the original request. The TL1 instruction set has become so ubiquitous in current operations support systems which manage network elements that several companies have devoted all or part of their web sites to TL1 to better serve the public. One such company is Lumos Technologies, Inc. of Santa Monica, Calif. whose web site is currently accessible at www.lumos.com.

To accommodate differences in implementation and software versions, as well as the large variety of network elements that now exist, current TL1 engines use supplemental software created by an applications generator that interacts with a Craftperson to format TL1 CIT commands and to initiate execution of the formatted commands through the command router. This procedure has been dubbed "parsing and validation". As used herein the term "parsing" means splitting a message string up into its constituent parts, for example the message name, and one or more optional or required parameters defining message fields. Also as used herein, the term "validation" means checking a message and its contents to ensure that the message and its constituent parts are valid for a given message set.

A well-known applications generator for generating the software to perform parsing and validation, especially for TL1 strings, is the Dialog Code Generation System ("DCGS"). DCGS, as well as most other applications generators, translates templates (which are usually handwritten commands) to C language. The templates are essentially commands which are requested by the network elements and used in a data transfer session to manage the particular network. Thus, every time that a new network element is added or new commands are to be implemented, a new template must be generated and potentially new TL1 code must be written to make the TL1 engine aware of the new commands and their parameters. This existing approach to parsing and validation of messages is computationally dense, and requires a great deal of time for the man/machine interface to work out and debug the new commands. Parsing and validation of messages according to this method also runs the risk of allowing invalid validation functions to be created since it relies on human interactions, which are prone to error, with the system. Therefore, existing parsing and validation techniques for real-time embedded software applications do not provide efficient and accurate results for networked systems with embedded software.

There accordingly exists a long-felt but unfulfilled need in the art for a message parsing and validation engine which is versatile and easily expandable for use in an operations support system that manages a network. Furthermore, as existing networks which utilize real-time, embedded software expand and become more complicated, the need becomes acute for a messaging system that can automatically parse and validate new management commands and protocols to implement additional network resources such as new elements and/or functionality. It would be beneficial if the performance of these tasks was carried out in an efficient and timely way, and in a manner which does not monopolize system resources. Such features, benefits and advantages have not heretofore been achieved with prior parsing and validation schemes.

SUMMARY OF THE INVENTION

The aforementioned long-felt but unresolved needs are fulfilled, and problems solved, by methods in accordance with the present invention for configuring and supporting command messages that are generated and implemented in a system that responds to command requests from a plurality of network elements. In a preferred embodiment, the inventive method includes the step of receiving a potentially valid command message from a network element in response to a command request and storing the potentially valid command message. The system parses and validates the command message to determine whether the command message is valid. Parsing and validation take place by accessing tables which contain all relevant information about the allowed parameters for command messages and if the command message is determined to comprise valid parameters, a data structure is populated with the valid parameters. New command messages can thus be constructed without the need to write separate code-based validation software, and standard, known commands can be processed quickly and efficiently.

The methods of configuring and supporting command messages in accordance with the present invention are versatile and flexible. The software which implements these methods is reusable across multiple system software releases without changes to the application programming interface (API) of the system for different networks. The software that implements these methods can support any number of command messages and is command message independent. Furthermore, the software can be updated on the fly without having to recompile the software or reset the system which utilizes it. The methods of validating and parsing command messages disclosed and claimed herein can support multiple languages and, indeed, can operate in more than one language at a time. Thus, for example, if one network element is operating in German and another operates in English, the validation database can concurrently support both languages and simultaneously confirm the validity of command messages for both network elements. This advantageous aspect of the invention is achieved by adding the appropriate fields to the validation tables in the database for each desired language. These abilities and functionality have not heretofore been achieved in the art.

These and other features of the present invention will become apparent from the following detailed description considered in conjunction with the accompanying drawings. It is to be understood, however, that the drawings are designed solely for purposes of illustration and not as a definition of the invention, for which reference should be made to the appended claims.

BRIEF DESCRIPTION OF THE DRAWINGS

In the drawings, wherein like reference characters refer to corresponding elements throughout the several views.

DETAILED DESCRIPTION OF THE PREFERRED EMBODIMENTS

Figure 1:
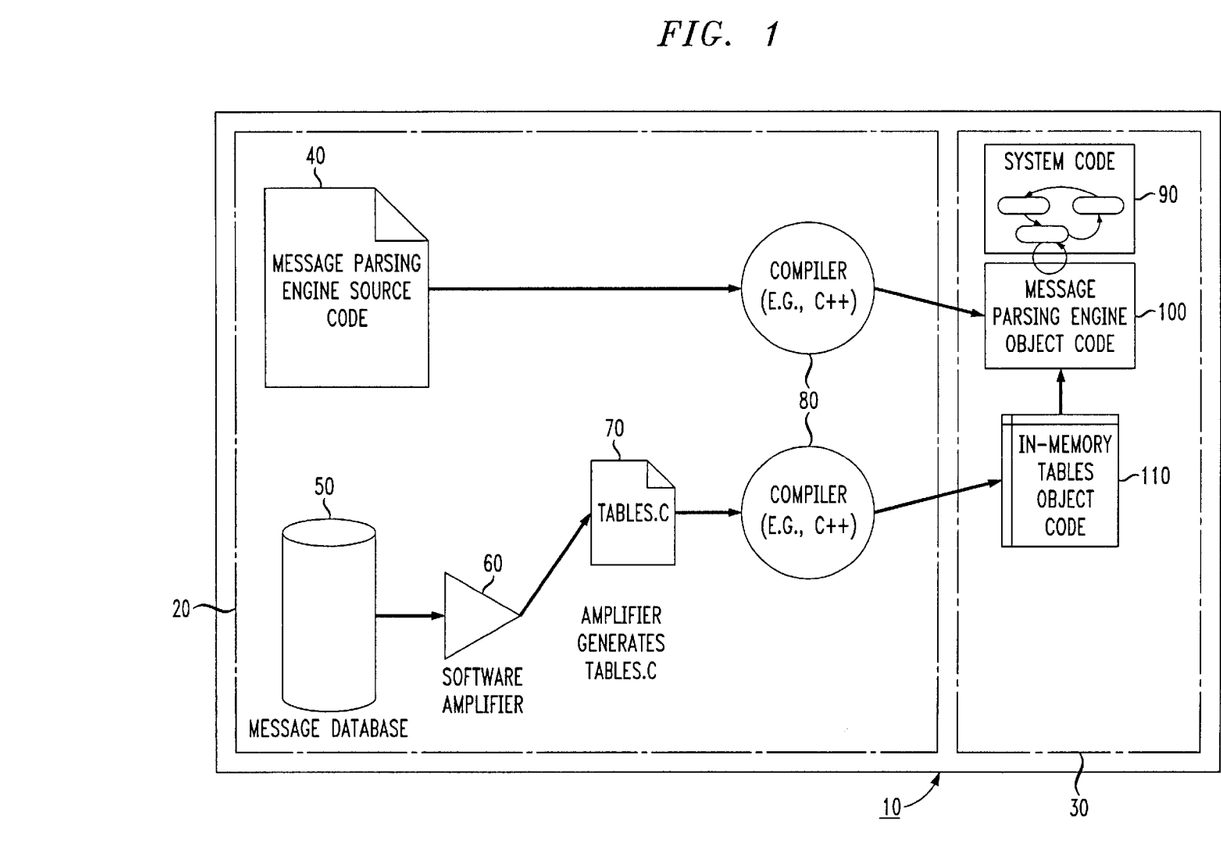
FIG. 1 is a block diagram of a first embodiment of a message parsing and validation engine in accordance with the present invention.

Referring now to FIG. 1, a command message parsing and validation system in accordance with the present invention is there shown and identified by the general reference numeral 10. As used interchangeably herein, the terms "command message" and "message" mean a complete unit of information that passes among two or more entities, as for example but without limitation, a telecommunications network and software implementing processing instructions or procedures in an operations support system that manages elements in the telecommunications network. A "message set" is the total corpus of messages available for a given system and is formed of all messages and their possible contents that will or can be recognized as valid for a given system. A "message name" is a unique identifier for each message in the message set. "Parameters" are the individual fields in a message and can be, for example, integers, strings and lists, all of which must fall within a set or range of allowed values; values of parameters which fall outside of the allowed sets or ranges are invalid and will be cause for rejecting as invalid an entire message incorporating the invalid parameters.

In a preferred aspect of the message parsing and validation system of FIG. 1, the parsing and validation procedure is distributed across at least two computer systems. A development computer system 20 acts as a development environment for the system and operates on the required source codes to produce compiled computer code which will accomplish parsing and validation of the messages. Development computer system 20 may be implemented on a PC or a UNIX workstation. The compiled code is downloaded in object code modules to a target computer system 30 where the object code modules become part of the target computer system. Target computer system 30 is associated with a particular network element that is to be controlled by the operations support system that manages the network. Target computer system 30 may also be implemented on a PC or a UNIX workstation, or may comprise an embedded system controller of the network element.

Development computer system 20 includes a message parsing engine 40 that contains the source code for parsing messages. Message parsing engine 40 may be written in any programming language, but it is currently preferred that this software be written in C++. The term "parsing engine" used herein with reference to the invention means a parser/validator that uses a set of tables to perform the parsing and validating functions. Parsing engines described and claimed herein can be used for many different message sets simply by modifying or replacing the tables. This is in stark contrast to prior art parsing and validation engines which are code-based and therefore must have their programming modified whenever the message set changes in any way. Development computer system 20 also includes a database 50 that contains the raw information about the various parameters of messages in the message set that will control the network elements in the system. Database 50 is preferably maintained in a database management system on development computer 20, and may for example be implemented using the Microsoft ACCESS database management software available from Microsoft Corp., Redmond, Wash.

A software amplifier 60 is interfaced to database 50 and implements a transform program that reformats and outputs the data in database 50 as a file containing data tables 70 written in the same programming language as is message parsing engine 50. The tables 70 are used to perform the message validation procedure in accordance with the present invention. The source code of message parsing engine 40 and the tables 70 are compiled by development computer 20 using an appropriate compiler 80, as for example a C++ compiler, to produce the object code modules that will be linked and transferred to target computer 30.

Target computer 30 may be located, or embedded in or as a part of, or may otherwise be associated with, the network element (sometimes referred to as an "embedded system") which will be controlled by the operations support system that utilizes message parsing engine and validation techniques in accordance with the present invention. Target computer 30 includes a system code 90 that controls the embedded system's functionality as it interacts with the operations support system and an outside environment of the network. The compiled message parsing engine is stored as object code at 100 in target computer 30, and the compiled tables are stored in target computer 30 as in-memory tables object code 110. The embedded system interfaces to the message parsing engine object code 90 by a function call which will begin the parsing and validation procedure for the control messages. In a preferred embodiment, this function has been denoted "do Validate()" wherein "()" designates an argument containing the message to be parsed and an argument containing an address of a buffer area in which the do Validate function will place a data structure containing the validated message in a system-recognizable form. The do Validate function parses the message, validates each part against its allowed range using the data stored in the in-memory tables 110, and transforms the message into a data structure that system code 90 can then process. In-memory tables 110 are preferably implemented by standard random access memory (RAM) integrated circuit chips, but those skilled in the art will recognize that any suitable storage structure or device may he utilized to implement the in-memory tables. After parsing and validation of the message is accomplished and the data structure is populated, the data structure is sent to another software module on the same embedded system for execution. When the system executes the command and sends the result back to the engine, the data structure containing the output parameters is converted back to the syntax of the operation support system language and sent to the requesting network element as a response to the original command execution request.

Figure 2:
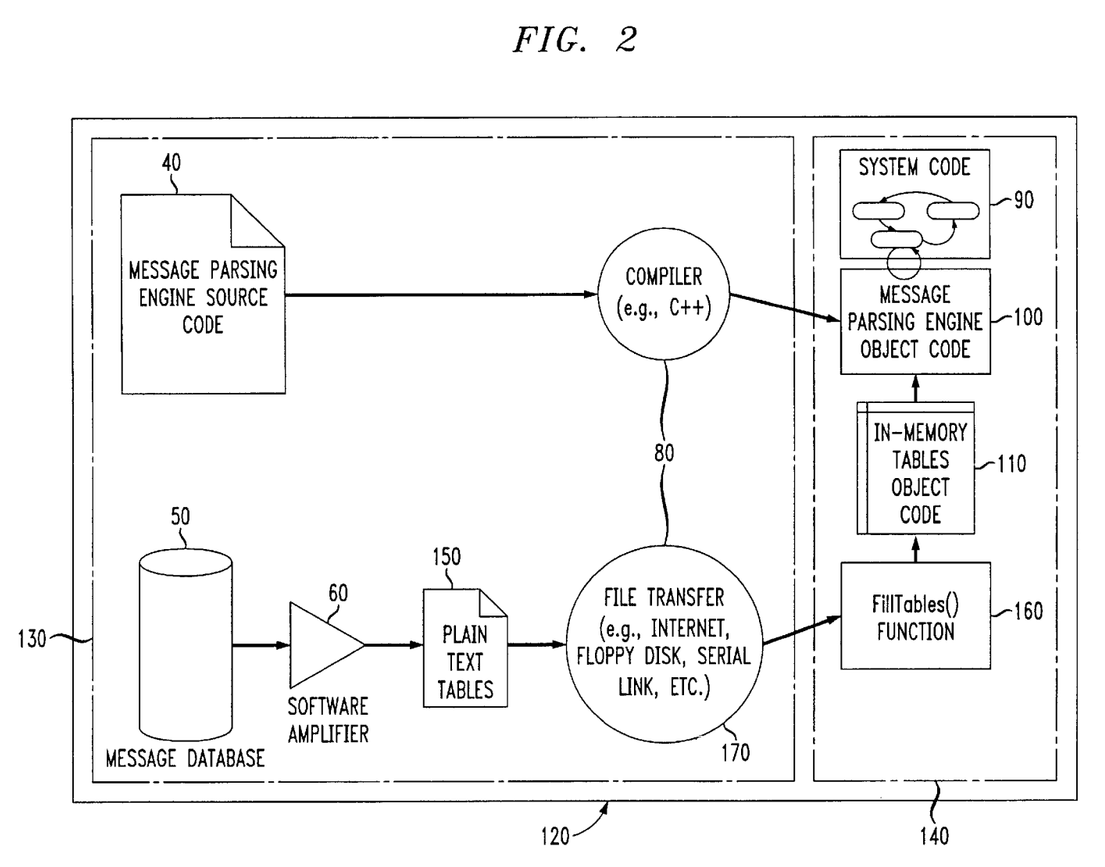
FIG. 2 is a block diagram of a second embodiment of a message parsing and validation engine in accordance with the present invention.

FIG. 2 depicts an alternative embodiment in accordance with the invention of a message parsing and validation system identified by the general reference numeral 120. As in the embodiment of FIG. 1, system 120 comprises and is distributed across a development computer 130 and a target computer 140. In this configuration, the system 120 is operable for reading a new set of in-memory tables 110 while the system is running. To accomplish this result amplifier 60 generates a file 150 that contains a plain text version of the datatables stored in message database 50. The plain text tables 150 are then formatted by a system function 160 which reformats the datatables and places them in the in-memory tables module 110. In a preferred embodiment, this function is accomplished by a "fillTables ()" routine wherein the "()" designates an argument which calls the filename that must be reformatted and placed in the in-memory tables 110. The plain text files 150 may be transferred at 170 to target computer 30 by an external network such as a LAN or WAN, over the Internet, by floppy disk or by a serial link from an external computer, for example.

The above-described operations for each of the embodiments of FIG. 1 and 2 are accomplished at run-time at which the engine software reads the database tables 110, thereby receiving all the information necessary to accomplish parsing and validation of messages. Advantageously, the engine of the present invention does not have to know at compile-time the set of commands supported by the system. The engine can accordingly support any command, provided that it is entered into the database 50 in the appropriate format. Neither is it necessary to recompile the software to support a new command.

With the embodiment of the engine of FIG. 2, it is possible in accordance with the invention to download a new database to the embedded system and direct the engine to read the new tables so as to enable it to start parsing and validating a new set of commands without resetting the system or dropping the session currently in progress. In this situation, the next message string is parsed and validated against the newly downloaded database. This is in stark contrast to prior message parsing and validation schemes which require that each time a new command and/or parameter is added to the system, the parser/validator itself must be modified to accommodate the change. Because the software of the present invention is structured as a table-based system and operates in this fashion, much less memory is required as compared to prior code-based approaches to perform message parsing and validation. Thus, the message parsing and validation methods of the present invention evince many advantages over prior art methods.

Each of the records in database 50 defines at least an aspect of the parameters of the messages which will be parsed and validated in accordance with the present invention, and may define all of the characteristics of the particular parameter being validated. It will be recognized by those skilled in the art that the table-based message parsing and validation approach described herein may be applied or implemented in virtually any operations support system that uses a message-based control language to manage a network. The message parsing and validation procedures described and claimed herein are particularly useful for the TL1 message instruction set; the record format in the datatables 70, 150 for an exemplary TL1 message set may take the following generic:

Table Begin: TableName
field1,field2, . . . fieldN
value1/value2/ . . . /valueN
value1/value2/ . . . /valueN
. . .
Table End: TableName where TableName is the name of the internal table in memory, fieldN is the name of the Nth field, and valueN is the value represented by a string of the Nth field.

For a TL1 message set, the names of the tables internally stored in RAM by the engine are:

| Name | Description |
| --- | --- |
| Tcmd | TL1 commands |
| Taid | Access Identifier addresses of System Entities |
| Tparam | Command Parameters |
| TparamSet | Parameter Sets |
| TlistVal | List of Possible Values |

Typical entries in the Tcmd and Taid tables may therefore appear as follows:
Table Begin: Tcmd
exVerb, exMod1, exMod2, verb, mod1, mod2, paramSet, abortable, privilegCode,
confirm, fileexfer, fileDirection, cmdID
ACT/USER//Acitvate/User//ACT-USER/False/2/False/False/0/377
ALW/ALMMSG//Allow/Alarm Messages//ALW-ALMMSG/False/0/False/False/378
. . .
Table End: Tcmd
Table Begin: Taid
aidSpec, aidID, entity, exEntity, param1, param2, param3, param4
all/1421/DS1 Circuit Pack/iods1/1/1-6//
all/1422/DS1 Protection Circuit Pack/iodslp/1///
. . .
Table End: Taid Tcmd is the table of all supported TL1 commands; it contains the data necessary to validate a TL1 command code against standard TL1 syntax. Thus, while the message is being parsed, validation occurs as follows:

verb[-modifier1[modifier2]]:[tid]:aid[,aid2]:
[ctag]:[gb]:[p_block1]:[p_block2]:[p_block3];
where
verb[-modifier1[-modifier2]] is the command code,
tid is the Target ID,
aid[,aid2] is/are the access identifier(s),
ctag is the correlation Tag,
gb is the general block,
p_block1 is the common parameter block,
p_block2 is the specific data parameter block, and
p_block3 is the state parameter block.

The Tcmd table includes information about verb, modifier1 and modifier2, and also includes a field called "paramSet" that is used to relate the command code to its parameter set, which is defined as the combination of all parameter blocks. The remaining flag fields in Tcmd are used to determine whether the command is abortable, the command privilege code, whether a confirmation is required before the command is executed, and whether there is a file transfer involved in the execution of the command.

The Taid table includes all of the allowed access IDs in the system, and is used to validate any access ID passed in the command string. TparamSet is used as an index table in conjunction with Tparam to join the Tcmd and Tparam tables together and to retrieve the required parameters in a message string for a particular command. Tparam also contains for each parameter its type, range, default value (if any), and whether the particular parameter is required for the message currently being validated. The TlistVal table contains the list of all possible values for each list-type parameter.

Thus, for a TL1 message parsing and validation engine utilizing the table-driven approach of the present invention, the above-described tables are stored in the in-memory table object code 110 and used to validate the TL1 command messages while the message parsing engine object code 100 parses the command messages. If new commands must be parsed and validated, the tables are simply updated, or new tables are created with additional parameter fields, and stored in the in-memory tables 110. As should now be apparent, the TL1 network management regime is simply an example of an operations support system that can implement table-driven message parsing and validation in accordance with the present invention. Those with skill in the art will recognize that other software management systems, such as for example CMIP and SNMP, may also be similarly modified and are amenable to the inventive approach. All such table-driven parsing and validation engines are intended to be within the scope of the present invention.

Figure 3:
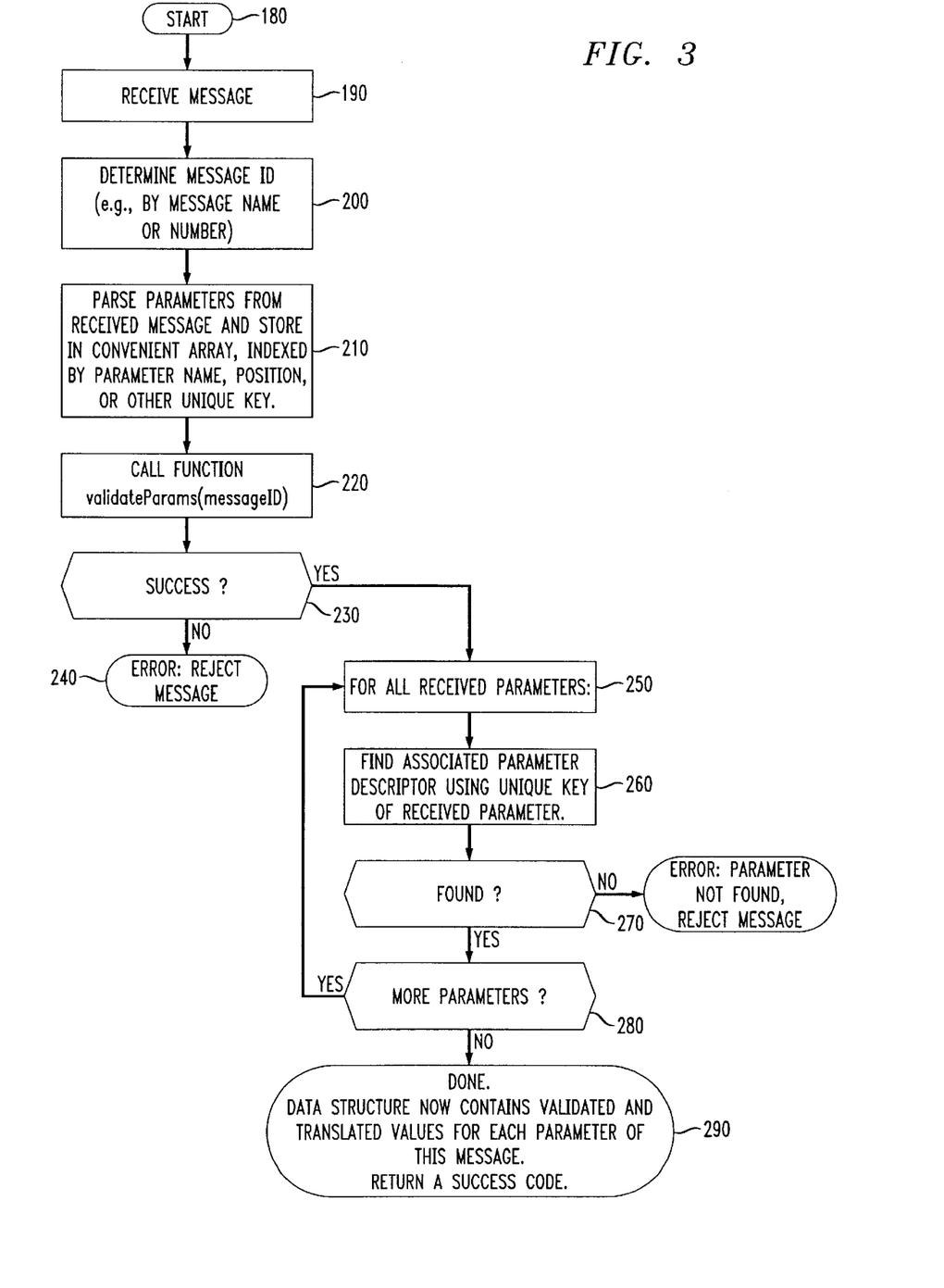
FIG. 3 is a flow chart of a preferred method of table-driven parsing and validation of command messages in accordance with the present invention.

Referring flow to FIG. 3, the flow chart there shown illustrates operation of the inventive message parsing and validation procedure after the parsing engine object code 100 is downloaded and the in-memory tables 110 are created. The method begins at step 180 and a data string which is a potential command message is received at 190 by the system code of the network element. It is then preferred to determine the message ID, for example the message name or number, at step 200. The system code then calls the doValidate() routine with the appropriate argument for the potential command message. The doValidate routine begins parsing engine object code 100 to parse the potential command message at 210 and stores the parameters in a convenient fashion, as for example in an array or indexed by parameter name, position or other unique key. Simultaneously, the tables of the in-memory module are accessed at 220 by the function validateParams(message ID) to determine whether each parameter in the string is valid, i.e., found in the tables. If the parameter is not found in the tables at step 230, then an invalid command message is output by the network element at 240 and the procedure ends at 240.

It is now known that all required parameters are present and that all legal parameters for the message are valid. The system then checks to ensure that no extraneous parameters are present in the message. The system then loops through all received parameters at steps 250, 260, 270 and 280. At step 260 it is determined whether an associated parameter description is found using the unique key of the received parameter as compared to the data found in the tables. If the associated parameter is found in the tables at 270 the code looks for parameters at 280. If more parameters are found at 280, the method returns to step 250. Otherwise, there are no additional parameters and at step 290 the process is complete and the data structure is fully populated with the parameter values in the internal, binary, machine-level format of the computer that the engine runs on. If at step 270 the parameter descriptor is not found in the tables, then the parameter is extraneous, an error has occurred and the message is rejected at step 300.

Figure 4A:
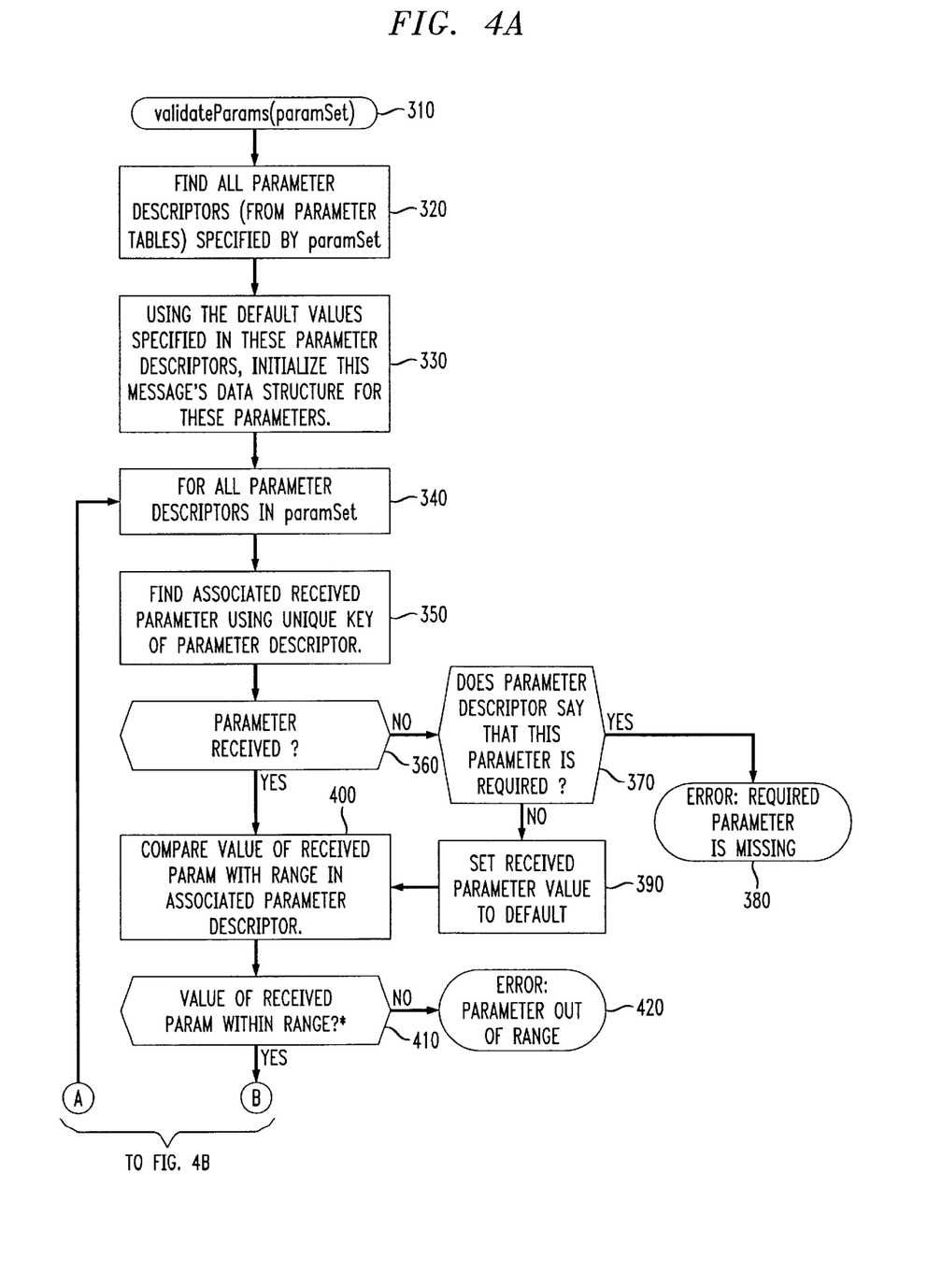
FIG. 4 is a flow chart of a preferred method for validating messages having parameters in accordance with the present invention.
Figure 4B:
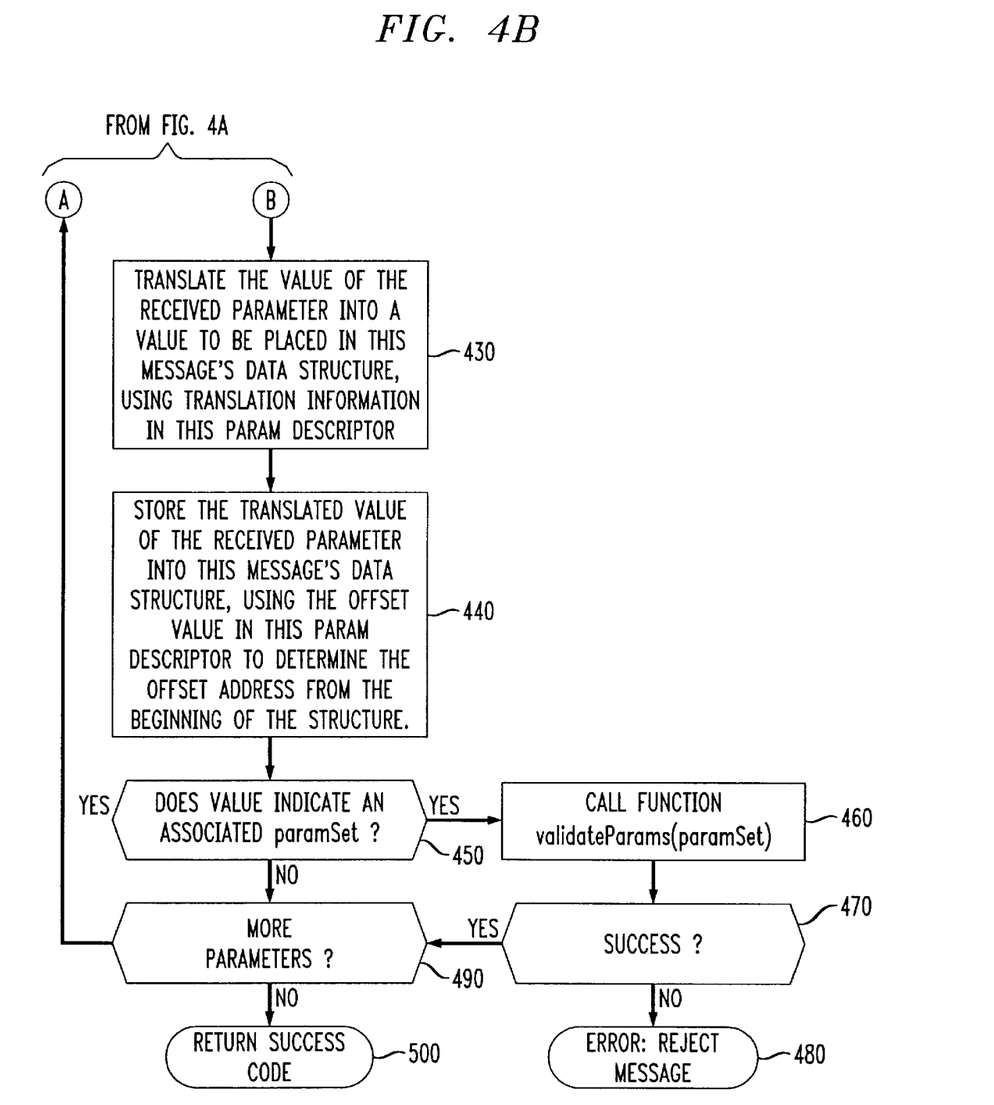

Referring now to FIG. 4, the flow chart there shown illustrates the operation of the validateParams() function illustrated for the argument "paramSet," which specifies the name of a set of parameters stored in the data tables for the exemplary TL1 network command language. To validate this paramSet, the doValidate() function calls validateParams(paramSet) at 310. This function then finds all parameter descriptors at 320 from the tables that are specified by paramSet. Using the default values specified in these parameter descriptors at 330, the function then initializes the data structure for this message. For all the parameter descriptors in paramSet at 340, the function finds at 350 the associated received parameter using the unique key of the parameter descriptor.

It is then determined at step 360 whether the parameter is received. If not, then it is determined at step 370 whether this is a required parameter for the message. If so, then at step 380 it is determined that an error has occurred since a required parameter is missing. If, on the other hand, this is not a required parameter, then at step 390 the received parameter is set to a default value and the method moves on to step 400. However, if it is determined at step 360 that a parameter was indeed received, then at step 400 the value of the received parameter is compared with the range in the associated parameter descriptor.

If at step 410 it is determined that the value of the received parameter is outside the range of the associated parameter descriptor, then an error is output at step 420. If, on the other hand, the value of the received parameter is within the received parameter range, then at step 430 the value of the received parameter is translated to a value to be placed in the data structure of this message using translation information found in this parameters's descriptor. The translated value is then stored at 440 in the message data structure using an offset value which is also found in the parameter's descriptor that determines the offset address from the beginning of the message structure.

It is then determined at step 450 whether the translated value indicates an associated paramSet. If so, then it step 460 the function validateParams(paramSet) is called and it is determined at step 470 whether the parameters in this paramSet are valid. If they are not, then an error message is produced at step 480 and the message is rejected. If, on the other hand, they are valid then the method moves on to step 490. However, if at step 450 it is determined that the value does not indicate an associated paramSet then at step 490 it is determined whether there are any additional parameters. If so, then the method returns to step 340 for validation of the additional parameters. Otherwise, the message data structure has been populated with valid parameters and a success code is returned at step 500 which ends the method for this particular message.

Methods of configuring and supporting command messages in accordance with the present invention are versatile and flexible. The software which implements these methods is completely reusable across multiple system software releases without having to change or modify the API of the system for different networks. The software that implements these methods can support any number of command messages, and is thus command message independent. Furthermore, this software can be updated on the fly without having to recompile the software or reset the system which utilizes it. In contrast, heretofore known message parsing and validation schemes require that each time a new command and/or parameter is added to the system, the parser/validator itself must be modified to accommodate the change. Moreover, since the software of the present invention is structured as table-based system, much less memory is required as compared to prior code-based approaches to perform message parsing and validation, and updating of the tables is quick and efficient. These features, benefits and advantages have not heretofore been present or achieved in the art.

While there has been shown and described certain fundamental novel features of the present invention as applied to preferred embodiments thereof, it will be understood by those skilled in the art that various omissions and substitutions and changes in the devices and methods described herein, and in their operation, may be made by those with skill in the art without departing from the spirit and scope of the invention. It is expressly intended that all combinations of those elements and/or method steps which perform substantially the same function in substantially the same way to achieve the same result are within the scope of the invention. Substitutions of elements from one described embodiment to another are also fully intended and contemplated. It is the intention, therefore, to be limited only as indicated by the scope of the claims appended hereto.

What is claimed is:

1. A method of configuring and supporting command messages in a network that responds to command requests from a plurality of network elements each having an interface that communicates with an operations support system of the network, comprising the steps of:

receiving at one of the plural network elements from the operations support system, through the interface of the one network element, a set of data that comprises a set of allowed parameters that will make up a potential command message;

storing the received set of data in a memory at the one network element;

generating at the one network element from the received set of data a potential command message which comprises a set of constituent parameters;

parsing the potential command message generated at the network element into its constituent parameters;

comparing each of the constituent parameters from the parsed potential command message to the set of allowed parameters in the memory and determining from said comparison whether each said constituent parameter is an allowed parameter; and populating a data structure at the one network element with all of the constituent parameters that have been determined to be allowed parameters.

2. The method recited in claim 1, further comprising the step of accessing a database that comprises the set of data of the allowed parameters to obtain the set of allowed parameters data for receipt at one of the network elements.

3. The method recited in claim 2, further comprising the step of formatting the set of data of the allowed parameters obtained from the database into a set of tables corresponding to an allowed format of the allowed parameters in a system language that the operations support system operatively uses to command and control the network.

4. The method recited in claim 3, wherein the system language comprises Transaction Language 1.

5. The method recited in claim 4, wherein said formatting step comprises the step of generating the set of tables in a source code language.

6. The method recited in claim 5, further comprising the step of accessing a software engine source code that contains commands for controlling parsing of the command message into its constituent parameters, wherein the engine source code is written in the source code language of the set of tables.

7. The method recited in claim 6, further comprising the step of compiling the set of tables in the source code language and the software engine source code into object code.

8. A method of parsing and validating a message that is generated by a network element in a network, comprising the steps of:

receiving from the network element a data string comprising a potentially valid command message, and storing the received data string in a format in a buffer;

parsing the data string by separating the data string into constituent parts which comprise a set of potentially allowed parameters;

validating each of the potentially allowed parameters from the parsed data string by comparing said each potentially allowable parameter to a set of allowable parameters stored in a table; and populating a data structure with all of the validated parameters.

9. The method recited in claim 8, wherein said parsing step comprises accessing a message parsing object code which has been generated by an operations support system of the network.

10. The method recited in claim 9, wherein said validating step comprises accessing a set of tables in object code form which have been generated by the operations support system of the network.

11. The method recited in claim 10, wherein the format comprises Transaction Language 1 format.

12. The method recited in claim 11, further comprising the step of outputting the populated data structure to a network element system code.

* * * * *